(12) United States Patent
Schermer

(10) Patent No.: US 6,974,521 B2
(45) Date of Patent: Dec. 13, 2005

(54) METHOD FOR SEPARATING A FILM AND A SUBSTRATE

(75) Inventor: Johannes Jacobus Schermer, Nijmegen (NL)

(73) Assignee: Katholieke Universiteit Nijmegen, Nijmegen (NL)

( * ) Notice: Subject to any disclaimer, the term of this patent is extended or adjusted under 35 U.S.C. 154(b) by 0 days.

(21) Appl. No.: 10/399,418

(22) PCT Filed: Oct. 17, 2001

(86) PCT No.: PCT/NL01/00765

§ 371 (c)(1),
(2), (4) Date: Jul. 30, 2003

(87) PCT Pub. No.: WO02/32667

PCT Pub. Date: Apr. 25, 2002

(65) Prior Publication Data
US 2004/0033651 A1 Feb. 19, 2004

(30) Foreign Application Priority Data
Oct. 18, 2000 (NL) ............................................. 1016431

(51) Int. Cl.⁷ .......................... B32B 35/00; H01L 21/46
(52) U.S. Cl. ...................... 156/247; 156/344; 156/584; 438/458
(58) Field of Search ................................ 156/344, 584, 156/247; 438/455, 458

(56) References Cited

U.S. PATENT DOCUMENTS

| | | | |
|---|---|---|---|
| 4,508,589 A | 4/1985 | Tarui et al. | |
| 4,883,561 A | 11/1989 | Gmitter et al. | |
| 5,376,210 A | 12/1994 | Brochu et al. | |
| 5,540,809 A | * 7/1996 | Ida et al. | 156/584 |
| 5,743,990 A | * 4/1998 | Iwami et al. | 156/344 |
| 6,500,298 B1 | * 12/2002 | Wright et al. | 156/344 |
| 6,681,829 B2 | * 1/2004 | Baccini | 156/584 |

FOREIGN PATENT DOCUMENTS

| | | |
|---|---|---|
| DE | 26 34 413 A | 2/1977 |
| DE | 27 47 265 A | 4/1979 |
| EP | 1 069 602 A | 1/2001 |

OTHER PUBLICATIONS

Patent Abstracts of Japan, vol. 018, No. 091 (E–1508), Feb. 15, 1994 & JP 05 299362 A (Sumitomo Electric Ind Ltd), Nov. 12, 1993 abstract.

* cited by examiner

*Primary Examiner*—Mark A. Osele

(57) ABSTRACT

A method for separating a film and a substrate, the method comprising the following stops: a) on the film at least a part of a foil is provided, whereby an adhesive contact between the film and the foil is effected; b) the foil and the film being in adhesive contact therewith are bent away from the substrate; and c) the film is uninterruptedly separated from the substrate, characterized in that at least a part of the foil is attached to a circumferential surface of a roller, which circumferential surface virtually touches the substrate, and wherein during step b) the substrate with the film, relative relative to the roller, is fed to the roller, while the roller is rotated such that during step c) and increasing part of the film is bent around the circumferential surface, while an increasing part of the substrate from which the film has been separated is led, relative to the roller, away from the roller.

18 Claims, 2 Drawing Sheets

METHOD FOR SEPARATING A FILM AND A SUBSTRATE

The invention relates to a method for separating a film and a substrate, the method comprising the following steps: a) on the film at least a part of a foil is provided, whereby an adhesive contact between the film and the foil is effected; b) the foil and the film being in adhesive contact therewith are bent away from the substrate; and c) the film is uninterruptedly separated from the substrate.

Such a method is known per se. Such a method finds application there where separation of a film and a substrate is to take place after the film has been provided on the substrate with the aid of a growing process especially designed for that purpose, or according to a different production method. The application in particular concerns separating from a substrate a monocrystalline semiconductor film which is suitable for the production of optoelectronic components. To be considered here are, for instance, light emitting diodes, lasers and solar cells. Such a film typically consists of a structure built up from various layers, which has been deposited on a substrate having an atomic structure suitable therefor. The substrate is typically of high-grade quality and costly. It is therefore of importance that the substrate, after stripping the film, can be used again for providing a new film thereon. The film typically concerns a wafer-thin and possibly even monocrystalline film, which moreover can be very fragile. The term film in this connection comprises a film of which a thickness is, for instance, between 10 nanometers and 100 micrometers. In a known method, during the separation of the film and the substrate, the substrate is suspended from a rod, such that the film is situated under the substrate in a horizontally or diagonally oriented plane. On the film a part of a foil is provided, whereby an adhesive contact between the film and the foil is effected, which can take place, for instance, in that the foil is provided with a slightly adhering layer at the surface. The foil and the film being in adhesive contact therewith are bent away from the substrate by suspending a weight from a part of the foil not in contact with the film. The part of the foil situated between the point of engagement of the weight and the point at which the foil contacts the film is thereby curved. Since the film is in adhesive contact with the foil, the film is bent away from the substrate to some extent. When the bond between the film and the substrate is sufficiently weak, the film will be separated from the substrate in this way. A disadvantage of this method is that a curvature of the film and the foil, at the point where the film is separated from the substrate, changes according as a greater part of the film has been separated from the substrate. This curvature can become so great, i.e., the radius of curvature of the curved foil part can become so small, that the carefully grown film breaks off. A still greater problem is that the foil can start to vibrate, which entails a varying curvature of the foil and may be accompanied by a progressive break formation in the film.

The object of the invention is to control the curvature of the foil during the separation of the film from the substrate.

The object mentioned has been achieved with the method according to the invention, which is characterized in that at least a part of the foil is attached to a circumferential surface of a roller, which circumferential surface virtually touches the substrate, and wherein during step b) the substrate with the film, relative to the roller, is fed to the roller, while the roller is rotated such that during step c) an increasing part of the film is bent around the circumferential surface, while an increasing part of the substrate from which the film has been separated is led, relative to the roller, away from the roller.

This provides the advantage that the foil at the point where the film is separated from the substrate, starts to curve following the curve of the roller. The curvature, or the radius of curvature, of the roller is selected such that it is large enough to separate the film from the substrate, but low enough to prevent the film breaking. The curvature will not decrease or increase when an increasing part of the film is separated from the substrate. The chance of damage to the film and/or the substrate is consequently minimal. Moreover, the film is supported by the foil, both during separation and directly after separation from the substrate, which also substantially precludes any chance of damage to the film directly after the separation from the substrate.

A preferred embodiment according to the method of the invention is characterized in that a sacrificial layer which is provided between the film and the substrate is at least partly removed at least during step c) with the aid of etching, which facilitates separating the film from the substrate. This provides the advantage that the bond is removed by etching away the sacrificial layer between the film and the substrate, so that separating the film and the substrate entails less chance of break formation in the film Sacrificial layer in this connection should be understood to mean a layer whose chemical composition is different from that of the film and from that of the substrate. This deliberately provided sacrificial layer comprises at least one atomic layer. In this case, a function of bending off the foil and the film in adhesive contact therewith further comprises further the keeping open of a slit which, partly as a result of the etching process, forms between the substrate and the film separating from the substrate.

A further preferred embodiment of the method according to the invention is characterized in that at least during step c) the substrate is led away from the roller substantially vertically upwards. This provides the advantage that the etching agent is collected in the slit, which is partly formed by the deflected film and the substrate, to enable the sacrificial layer to be etched away. If, by contrast, in the known method the sacrificial layer provided between the film and the substrate were to be etched away by the etching agent, the etching agent is held in position exclusively by a capillary action, which means that the surface tensions play a codetermainative role in the manner in which the etching agent comes into contact with the sacrificial layer. In this embodiment according to the invention, notably gravity and the orientation of the slit determine the manner in which the etching agent comes into contact with the sacrificial layer. In this case, it is not possible that the etching agent, as a result of unfavorable surface tensions, flows away from the sacrificial layer.

A particular embodiment of the method according to the invention is characterized in that at least during step c) the etching agent is supplied at a position such that the etching agent flows to the sacrificial layer under the influence of gravity. This provides the advantage that the administration of the etching agent can take place at some distance from the slit, which is formed by the deflected film and the substrate, so that less stringent requirements need to he imposed on the accuracy of the position where the etching agent is released from an etchant administration instrument. Moreover, the chance that the etchant administration instrument accidentally butts against the fragile film or the foil, and the film breaks, is rendered smaller in that a safe distance between the film and the etchant administration instrument can be maintained.

A particular embodiment of the method according to the invention is characterized in that at least during step c) the roller is slightly tilted, so that the slit and the sacrificial layer are oriented at a slight inclination along the substrate. This provides the advantage that the etching agent can be supplied at so high a position onto the slit oriented at a slight inclination along the substrate, that the etching agent can flow along the entire sacrificial layer under the influence of gravity. Moreover, this provides the advantage that the etching agent is freshened continuously, that the etching products are discharged, and that the entire sacrificial layer, such as it is exposed there where the film bends away from the substrate, can be removed with the aid of etching. Freshening of the etching agent also leads to the etching proceeding faster. In the known method, it might have been necessary to take care that the etching agent is provided or freshened along the entire sacrificial layer such as it is exposed there where the film deflects from the substrate, with the aid of, for instance, injection. In the known method, this injection, in view of the mechanically exerted pressure, additionally entails the chance of undue curvature of the foil and/or break formation in the film.

A still more advanced embodiment of the method according to the invention is characterized in that during step c), before the whole film has been separated from the substrate, at least the rotation of the roller is stopped, while a last part of the film is separated from the substrate only by etching away the sacrificial layer, so that a possible crumbling off of the last part of the film and/or the substrate can be prevented. When only a small surface of the film is still in contact with the substrate, the bending stresses can no longer be absorbed by a part of the film that is still to be bent away from the substrate. Locally, the elongation attendant to the stresses may then exceed the maximum permissible elongation in the film, which can lead to crumbling off of the last part of the film. With the measure mentioned, before the crumbling situation occurs, the sacrificial layer is removed by means of etching alone, without the film being further bent away from the substrate. Thus the last part of the film is separated from the substrate, albeit somewhat slower than a first part, while crumbling of the last part of the film is prevented. Preferably, both the rotation of the roller and the displacement of the substrate relative to the roller are stopped when the film is separated from the substrate only by etching away the sacrificial layer.

The invention will now be elucidated with reference to the drawing. In the drawing:

FIG. 1b shows a method according to FIG. 1a, wherein the separation of the film from the substrate is in a further advanced stage than in FIG. 1a;

FIG. 2b shows an embodiment according to the method as shown in FIG. 2a, wherein the separation of the film from a substrate is in a further advanced stage than in FIG. 2a.

Figure 1A:
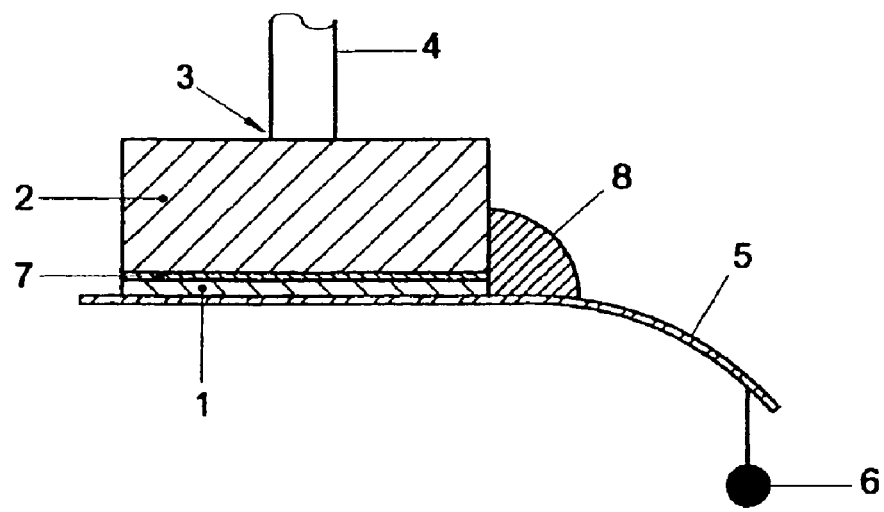
FIG. 1a shows a known method for separating a film from a substrate.
Figure 1B:
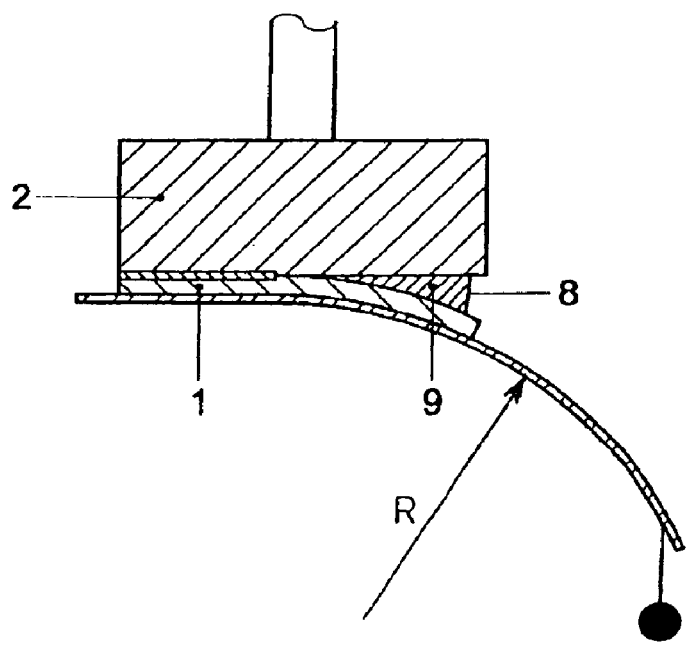

In FIG. 1a, a known method for separating a film 1 from the substrate 2 is shown. The substrate 2 is provided on a lower end face 3 of a rod 4 which is, for instance, directed vertically upwards and serves as holder for the substrate. A part of a foil 5 is provided on the film 1. The foil 5 is in adhesive contact with the film 1. Suspended from a part of the foil 5 that is not in adhesive contact with the film 1 is a weight 6. The foil is thereby bent away from the substrate 2. Given a sufficiently weak bond between the film 1 and the substrate 2, the film 1 separates from the substrate 2 through the deflection of the foil 5. As a result, the foil 5 bends away still further from the substrate. As a result, an increasing part of the film 1 separates from the substrate 2. This known method for separating a film 1 from a substrate 2 is often used in combination with the use of a sacrificial layer 7, which is provided between the film 1 and the substrate 2. The sacrificial layer 7 can be removed by etching with an etching agent 8. The etching agent 8, due to a capillary action can move into the slit 9 which is formed by the deflected part of the film 1 and the substrate 2. The deflection of the foil 5 and the film 1 can, in a first approach, be described by a radius of curvature R. When an increasing part of the film 1 is separated from the substrate 2, the radius of curvature R can decrease. The attendant stresses in the film eventually lead to break formation in the film 1. Due to certain conditions, the foil 5 can start to vibrate, which entails a varying curvature of the foil 5 and is often accompanied by a progressive break formation in the film 1. Moreover, the etching agent 8, with a decreasing radius of curvature R, that is, with an increasing deflection of the part of the film 1 that separates from the substrate 2, can flow out of the slit 9 under the influence of gravity. Freshening the etching agent 8 will have to take place actively, for instance through injection, which is accompanied by a mechanical pressure exerted on the foil 5 and/or the carefully grown and fragile film 1. This too, due to change in the curvature in the foil 5, can lead to breakage in the film 1.

Figure 2A:
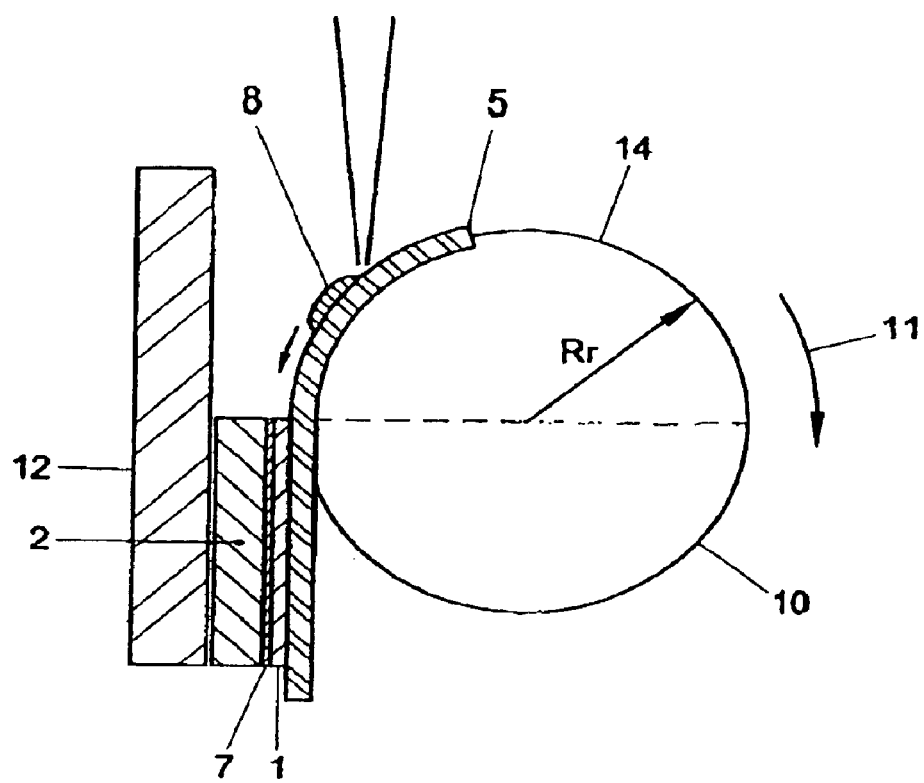
FIG. 2a shows an embodiment of a method according to the invention.
Figure 2B:
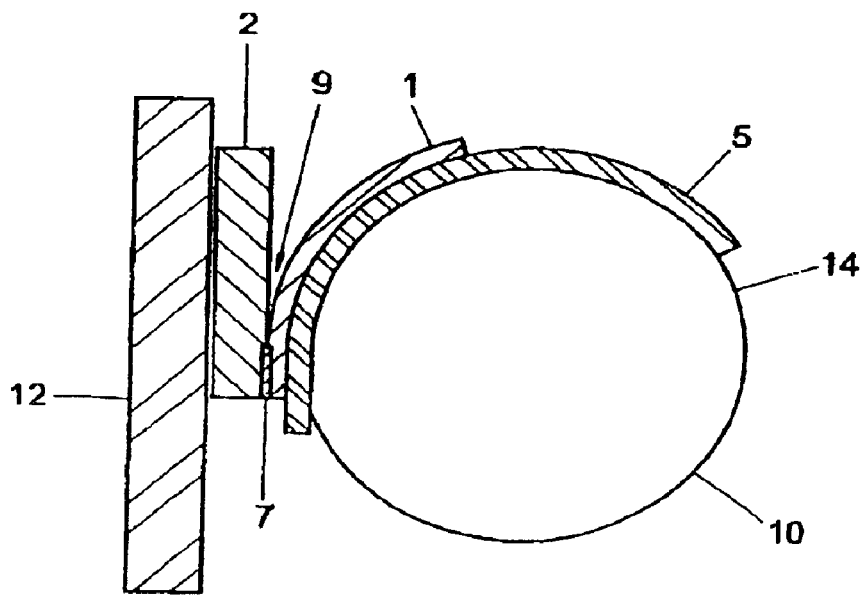

An embodiment of the method according to the invention is shown in FIG. 2a. A part of the foil 5, in this method, is attached to a circumferential surface 14 of a roller 10. The circumferential surface 14 virtually touches the substrate 2. A part of the foil 5 is in adhesive contact with the film 1. The substrate 2, with the film 1, is supplied relative to the roller 10, to the roller 10, while the roller 10 is rotated such that an increasing part of the film 1 is bent around the circumferential surface 14, while an increasing part of the substrate 2, relative to the roller 10, is led away from the roller 10. In this way, the film 1 is separated from the substrate 2. The direction in which the roller 10 rotates is indicated in FIG. 2a with arrow 11. A sacrificial layer 7 is exposed to an etching agent 8 in that the foil 15 and the film 1 are bent away from the substrate 2. The etching agent 8 can etch the sacrificial layer 7, so that taking the film 1 off the substrate 2 is facilitated. The substrate 2 is transported substantially vertically upwards away from the roller 10. The etching agent 8 can then be supplied at a position selected such that the etching agent 8, under the influence of gravity, moves to the sacrificial layer 7 exposed in the slit 9. In a very special embodiment, the roller can be tilted to some extent. As a result, the slit and the sacrificial layer present therein is oriented at a slight inclination along the substrate. As a result, the etching agent 8 can be supplied at such a position that the etching agent 8, while flowing under the influence of gravity, can flow along the entire sacrificial layer 7 such as it is exposed there where the film 1 bends away from the substrate 2. As a result, a continuous freshening of the etching agent 8 takes place, and the etching products are discharged better (over a known method). The substrate 2 can be guided with the aid of clamping or suction against a wall 12, such that the direction and the orientation of the substrate 2 during the separation of the film 1 from the substrate 2 do not change. The roller 10 is rotated at an angular velocity $\omega$, while the substrate 2, relative to the roller 10, is displaced at a velocity $V_s$, with $V_s$ being virtually equal to $\omega \times R_r$ where $R_r$ corresponds to a radius of the roller 10. The etching agent 8 and the sacrificial layer 7 are tailored to each other, such that the sacrificial layer 7 is etched out at a velocity $V_r$ which in magnitude is at least substantially equal to, and in direction is substantially opposite to, the displacement velocity $V_s$ of the substrate 2. As shown in FIG. 2b, before the whole film 1 has been separated from the substrate 2, rotation of the roller 10 is stopped. A last part of the film 1 is then separated from the substrate 2 exclusively by etching away the sacrificial layer 7. This prevents crumbling off of the last part of the film 1 and/or the substrate 2. In practice, the method is carried out such that the sacrificial layer 7 is etched away at a slightly greater velocity than $\omega \times R$. However, if, due to circumstances, it temporarily holds that the sacrificial layer 7 is etched away slightly faster than $\omega \times R$, etching away the sacrificial layer 7 will be rendered slightly more difficult in that the sacrificial layer 7 has not been able to expose itself to the etching agent 8 yet, since in situ the film 1 with the foil 5 has not yet, or not sufficiently so, been deflected from the substrate 2. Through a more or less self-regulating process, etching away of the sacrificial layer 7 will therefore be done such that etching away takes place there where the film 1 is deflected from the substrate 2. A separation according to the invention of a carefully grown monocrystalline film from a substrate, whereby a sacrificial layer included between the film and the substrate is etched away, can take place at a detachment speed which is between a few millimeters per hour and tens of centimeters per hour.

In the method according to the invention, etching away of the sacrificial layer 7 can moreover not be limited by discharge of gaseous etching products, which is an advantage over a known method for separating a film 1 and a substrate 2, where the substrate 2 can render the upward flow of the etching products more difficult.

The invention is not limited in any way to the exemplary embodiment shown.

Although in the exemplary embodiment shown a foil 5 has been treated as a more flexible, windable, sheetlike material, the term foil within the context of the invention also comprises a material that is relatively stiff. In principle, any surface that is provided on the film 1 and that can either curve around a cylindrical object, or is shaped to curve at least partly following a substantially constant radius of curvature, within the meaning of the invention, can be considered to be a foil 5. Accordingly, the foil 5 can also, for instance, correspond to a wound or fixed jacket of the roller 10.

The substrate 2 can be held at a fixed position while the roller 10 is advanced, while rolling, over the substrate 2, whereby the film 1 is separated from the substrate 2. The adhesive contact between the foil 5 and the film 1 can be promoted by providing a layer of wax between the foil 5 and the film 1. Adhesive contact between the film and the foil should be understood to encompass a contact which has become adherent with the aid of vacuum suction through apertures in the foil. The film, after being separated from the substrate, can optionally be transferred by another technique to a support of another material. Attaching the foil to the circumferential surface of the roller can also take place with the aid of vacuum suction. Also, the foil can be attached to the circumferential surface of the roller by means of a friction enhancing agent and/or a tensioning means, so that the foil is supported against the circumferential surface.

The method lends itself eminently for adaptation to the properties of the film 1 and the substrate 2. Thus, the radius of curvature $R_r$ of the roller 10 can be selected such that even a very fragile film 1 can be separated from the substrate 2. AS already mentioned earlier, the film can comprise a monocrystalline film. It will be clear that also use of a roller with a gradually varying radius of curvature in radial and/or axial direction falls within the method of the invention. In fact, the control of the curvature of the foil 5 can take place as long as the foil 5 is provided on a gradually bent surface. Also the stiffness of the foil 5 and the strength of the adhesive contact between the foil 5 and the film 1 can be adapted to the required conditions, such as the obtained thickness and bending strength of the film 1 and the binding strength between the film 1 and the substrate 2. In this way, also a large number of substrates 2 with films 1 provided thereon can pass in series along the same large roller 10, while the films 1, without damage, are taken off the substrates 2. The method is therefore highly suitable for industrial upscaling. The etching agent and the structure and/or the composition of the sacrificial layer will in many cases be tailored to each other by the skilled person to achieve an optimum etching rate while maintaining a desired film quality. If desired, the etching agent can also be supplied into the slit 9 or to the sacrificial layer 7 through active injection, thereby avoiding unduly high mechanical pressure. Through the fixed curvature, break formation of the film 1 will be prevented. As a result, the etching rate increases, thereby also enabling a higher angular velocity of the roller 10 and/or a greater radius of the roller 10 and a higher displacement speed of the substrate 2.

Such modifications and variations are each understood to fall within the scope of the invention.

What is claimed is:

1. A method for separating a monocrystalline film and a substrate wherein a sacrificial layer is provided between the film and the substrate, the method comprising the following steps: a) on the film at least a part of a foil is provided, whereby an adhesive contact between the film and the foil is effected; b) the foil and the film being in adhesive contact therewith are bent away from the substrate; and c) the film is uninterruptedly separated from the substrate, wherein the sacrificial layer is at least partly removed at least during step c) with the aid of etching, thereby facilitating the separation of the film from the substrate, characterized in that at least a part of the foil is attached to a circumferential surface of a roller, which circumferential surface virtually touches the substrate, and wherein during step b) the substrate with the film, relative to the roller, is fed to the roller, while the roller is rotated such that during step c) an increasing part of the film is bent around the circumferential surface, while an increasing part of the substrate from which the film has been separated is led, relative to the roller, away from the roller.

2. A method according to claim 1, characterized in that at least during step c) the substrate is led away from the roller substantially vertically upwards.

3. A method according to claim 2, characterized in that at least during step c) the etching agent is supplied at such a position that the etching agent, under the influence of gravity, flows to the sacrificial layer.

4. A method according to claim 3, characterized in that at least during step c) the roller is slightly tilted, so that the sacrificial layer is oriented at a slight inclination along the substrate.

5. A method according to claim 4, characterized in that at least during step c) the roller is rotated at an angular speed $\omega$, while the substrate, relative to the roller, is displaced at a velocity $V_s$, with $V_s$ being substantially equal to $\omega \times R_r$, where $R_r$ corresponds to a radius of the roller.

6. A method according to claim 4, characterized in that at least during step c) an orientation and direction of the substrate, relative to the roller, is maintained.

7. A method according to claim 3, characterized in that at least during step c) the etching agent etches away the sacrificial layer at a velocity $V_s$ which in magnitude is at least substantially equal to, and in direction is substantially opposite to, $V_s$.

8. A method according to claim 3, characterized in that during step c) before the whole film has been separated from the substrate, at least the rotation of the roller is stopped, while a last part of the film is separated from the substrate only by etching away the sacrificial layer, thereby preventing crumbling off of the last part of the film and/or the substrate.

9. A method according to claim 2, characterized in that during step c) before the whole film has been separated from the substrate, at least the rotation of the roller is stopped, while a last part of the film is separated from the substrate only by etching away the sacrificial layer, thereby preventing crumbling off of the last part of the film and/or the substrate.

10. A method according to claim 2, characterized in that at least during step c) the roller is rotated at an angular speed $\omega$, while the substrate, relative to the roller, is displaced at a velocity $V_s$, with $V_s$ being substantially equal to $\omega \times R_r$, where $R_r$ corresponds to a radius of the roller.

11. A method according to claim 2, characterized in that at least during step c) an orientation and direction of the substrate, relative to the roller, is maintained.

12. A method according to claim 2, characterized in that:
- at least during step c) the etching agent is supplied at such a position that the etching agent, under the influence of gravity, flows to the sacrificial layer;
- at least during step c) the roller is slightly tilted, so that the sacrificial layer is oriented at a alight inclination along the substrate;
- at least during step c) the roller is rotated at an angular speed $\omega$, while the substrate, relative to the roller, is displaced at a velocity $V_s$, with $V_s$ being substantially equal to $\omega \times R_r$, where $R_r$ corresponds to a radius of the roller;
- at least during step c) the etching agent etches away the sacrificial layer at a velocity $V_s$ which in magnitude is at least substantially equal to, and in direction is substantially opposite to, $V_s$;
- at least during step c) an orientation and direction of the substrate, relative to the roller, is maintained;
- during step c) before the whole film has been separated from the substrate, at least the rotation of the roller is stopped, while a last part of the film is separated from the substrate only by etching away the sacrificial layer, thereby preventing crumbling off of the last part of the film and/or the substrate;

and wherein the foil is at the same time jacket of the roller.

13. A method according to claim 1, characterized in that at least during step c) the roller is rotated at an angular speed $\omega$, while the substrate, relative to the roller, is displaced at a velocity $V_s$, with $V_s$ being substantially equal to $\omega \times R_r$, where $R_r$ corresponds to a radius of the roller.

14. A method according to claim 13, characterized in that at least during step c) the etching agent etches away the sacrificial layer at a velocity $V_s$ which in magnitude is at least substantially equal to, and in direction is substantially opposite to, $V_s$.

15. A method according to claim 13, characterized in that at least during step c) an orientation and direction of the substrate, relative to the roller, is maintained.

16. A method according to claim 1, characterized in that at least during step c) the etching agent etches away the sacrificial layer at a velocity $V_s$ which in magnitude is at least substantially equal to, and in direction is substantially opposite to, $V_s$.

17. A method according to claim 1, characterized in that at least during step c) an orientation and direction of the substrate, relative to the roller, is maintained.

18. A method according to claim 1, wherein the foil is at the same time jacket of the roller.

\* \* \* \* \*

UNITED STATES PATENT AND TRADEMARK OFFICE
CERTIFICATE OF CORRECTION

PATENT NO. : 6,974,521 B2  Page 1 of 1
APPLICATION NO. : 10/399418
DATED : December 13, 2005
INVENTOR(S) : Johannes Jacobus Schermer It is certified that error appears in the above-identified patent and that said Letters Patent is hereby corrected as shown below:

Front page, Abstract (57), line 2, "stops" should read --steps--;

Front page, Abstract (57), line 11, delete "relative";

Column 2, line 43, "codetermainative" should read --codeterminative--;

Column 2, line 58, "he" should read --be--;

Column 4, line 39, "15" should read --5--;

Colum 4, line 66, "$V_r$" should read --$V_c$--;

Column 5, line 64, "AS" should read --As--; and

Column 7, line 30, "alight" should read --slight--.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,974,521 B2 | Page 1 of 1 |
| APPLICATION NO. | : 10/399418 | |
| DATED | : December 13, 2005 | |
| INVENTOR(S) | : Johannes Jacobus Schermer | |

It is certified that error appears in the above-identified patent and that said Letters Patent is hereby corrected as shown below:

Front page, Field (74) *Attorney, Agent, or Firm* is not listed. Should read --Weingarten, Schurgin, Gagnebin & Lebovici LLP--;

Signed and Sealed this

Third Day of October, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,974,521 B2 | Page 1 of 1 |
| APPLICATION NO. | : 10/399418 | |
| DATED | : December 13, 2005 | |
| INVENTOR(S) | : Johannes Jacobus Schermer | |

It is certified that error appears in the above-identified patent and that said Letters Patent is hereby corrected as shown below:

Front page, Field (74) *Attorney, Agent, or Firm* is not listed. Should read --Weingarten, Schurgin, Gagnebin & Lebovici LLP--;

Signed and Sealed this

Twenty-first Day of November, 2006

JON W. DUDAS
*Director of the United States Patent and Trademark Office*